United States Patent
Cranor et al.

(10) Patent No.: US 8,584,591 B2
(45) Date of Patent: *Nov. 19, 2013

(54) COMBINED THERMAL AND CHEMILUMINESCENT REACTION SYSTEM

(75) Inventors: Earl Cranor, Longmeadow, MA (US); Linda Jacob, Woodbridge, CT (US)

(73) Assignee: Cyalume Technologies, Inc., West Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,956

(22) Filed: Oct. 24, 2011

(65) Prior Publication Data

US 2012/0097063 A1 Apr. 26, 2012

Related U.S. Application Data

(60) Provisional application No. 61/406,151, filed on Oct. 24, 2010.

(51) Int. Cl.
F42B 12/40 (2006.01)
F21K 2/06 (2006.01)

(52) U.S. Cl.
USPC ................... 102/513; 362/34; 362/84

(58) Field of Classification Search
USPC ....... 102/513; 362/34, 84; 252/700; 116/211; 43/17.5, 17.6; 446/219
See application file for complete search history.

(56) References Cited

U.S. PATENT DOCUMENTS 3,749,679 A * 7/1973 Rauhut ........................ 52/700
3,816,326 A   6/1974 Bollyky
3,888,785 A * 6/1975 Tatyrek et al. ............... 252/700
4,308,395 A * 12/1981 Manfre et al. ................ 560/65
4,626,383 A   12/1986 Richter et al.
4,717,511 A * 1/1988 Koroscil ....................... 252/700
4,784,803 A * 11/1988 Borsotti ........................ 252/700
5,018,450 A * 5/1991 Smith ........................... 102/513
5,194,666 A * 3/1993 Sedlak et al. ................. 560/62
5,232,635 A * 8/1993 Van Moer et al. ........... 252/700

(Continued)

FOREIGN PATENT DOCUMENTS

WO    WO 03/077996 A2     9/2003
WO    WO 2008/127769 A2   10/2008
WO    WO 2011/014484      2/2011

OTHER PUBLICATIONS

"Synthesis and evaluation of diaryl oxalate esters for low-inensity chemiluminescent illumination", Aust. J. Chem., 37:73-86 (Jan. 1984).*

(Continued)

Primary Examiner — Bret Hayes
Assistant Examiner — Joshua Freeman
(74) Attorney, Agent, or Firm — Finnegan, Henderson, Farabow, Garrett & Dunner, LLP

(57) ABSTRACT

A multiple-part marking system that comprises at least one first part comprising at least one oxalate ester, at least one fluorescer, and at least one inorganic salt chosen from sodium thiosulphate, potassium thiosulphate, cobalt acetate, copper acetate, lead acetate, cupric chloride, ferric chloride, calcium iodide, potassium iodide, and silver nitrate; and at least one second part comprising at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles. Light and heat are emitted when the two parts interact.

15 Claims, 4 Drawing Sheets

(56) References Cited

U.S. PATENT DOCUMENTS

| | | | |
|---|---|---|---|
| 5,238,610 A * | 8/1993 | Thompson | 252/700 |
| 5,281,367 A | 1/1994 | Schleck et al. | |
| 5,298,197 A * | 3/1994 | Thompson | 252/700 |
| 5,348,690 A * | 9/1994 | Cohen et al. | 252/700 |
| 5,488,544 A * | 1/1996 | Ladyjensky | 362/34 |
| 5,508,893 A * | 4/1996 | Nowak et al. | 362/34 |
| 5,552,968 A * | 9/1996 | Ladyjensky | 362/34 |
| 5,597,517 A * | 1/1997 | Chopdekar et al. | 252/700 |
| 5,705,103 A * | 1/1998 | Chopdekar et al. | 252/700 |
| 6,126,871 A * | 10/2000 | Cranor | 252/700 |
| 6,497,181 B1 * | 12/2002 | Manole et al. | 102/513 |
| 6,619,211 B1 * | 9/2003 | Haeselich | 102/513 |
| 6,931,993 B1 * | 8/2005 | Manole et al. | 102/458 |
| 6,990,905 B1 * | 1/2006 | Manole et al. | 102/513 |
| RE40,482 E * | 9/2008 | Haeselich | 102/513 |
| 7,487,728 B2 * | 2/2009 | Cranor | 102/513 |
| 7,955,860 B2 * | 6/2011 | Harada | 436/172 |
| 7,964,119 B2 * | 6/2011 | Bindra et al. | 252/700 |
| 2002/0134274 A1 * | 9/2002 | Martinez et al. | 102/513 |
| 2003/0105111 A1 * | 6/2003 | Carver et al. | 514/254.02 |
| 2003/0111649 A1 * | 6/2003 | Park et al. | 252/700 |
| 2003/0116759 A1 * | 6/2003 | Park et al. | 252/700 |
| 2005/0237730 A1 * | 10/2005 | Barnes | 362/34 |
| 2006/0032393 A1 * | 2/2006 | Haeselich | 102/502 |
| 2006/0098420 A1 * | 5/2006 | Kaplan et al. | 362/34 |
| 2007/0079722 A1 * | 4/2007 | Parish | 102/513 |
| 2007/0119329 A1 * | 5/2007 | Haeselich | 102/498 |
| 2008/0035006 A1 * | 2/2008 | Ciesiun et al. | 102/513 |
| 2008/0053330 A1 * | 3/2008 | Haeselich | 102/513 |
| 2010/0175577 A1 * | 7/2010 | Ladyjensky | 102/513 |
| 2010/0282118 A1 * | 11/2010 | Ladyjensky et al. | 102/513 |
| 2011/0084243 A1 | 4/2011 | Cranor et al. | |
| 2012/0180686 A1 * | 7/2012 | Jones et al. | 102/365 |

OTHER PUBLICATIONS

International Search Report and Written Opinion in PCT/US2011/057437 dated Dec. 13, 2011, 10 pages.

* cited by examiner

COMBINED THERMAL AND CHEMILUMINESCENT REACTION SYSTEM

The present application claims priority to U.S. Provisional Patent Application No. 61/406,151, filed Oct. 24, 2010, which is incorporated herein by reference.

The present disclosure relates to markers and signals comprising a combined chemiluminescent and exothermic reaction. The markers and signals can be used in military and non-military training, and in tactical operations.

Markers are used by both military and non-military organizations in training, tactical operations, and on the battlefield. The markers act to visually identify targets such as the ground location of enemy equipment and vehicles. Additionally, tracers are employed that allow an observer to visually trace a projectile's trajectory, such as after the firing of munitions. Chemiluminescent markers and tracers emit light in the visible, ultra-violet, or infrared spectrum as the result of a chemical reaction. One such reaction is the activation of a fluorescer with hydrogen peroxide in the presence of a catalyst.

Military forces participating in night operations are normally equipped with various different types of vision devices, including night vision goggles, thermal goggles, and thermal cameras. Frequently, personnel within one unit will be equipped with different types of vision devices. For example, a troop carrier may have a gunner using thermal goggles and troops using night vision goggles. A marker that emits a chemiluminescent signal will be visible to the troops with night vision goggles, but not to the gunner with the thermal goggles. Similarly, the gunner, with thermal goggles will be able to see a heat marker, but the troops with the night vision goggles will not. Additionally, there may be variations within the night vision goggles with regard to what micron wavelength the goggles operate in, leading to a variation in the wavelengths of light that are visible. Currently, there is not one marker that would be visible with all of the different types of vision devices with which military personnel may be equipped. There is therefore a need for such a marker that may be visible with thermal and/or night vision devices.

It is accordingly an object in certain embodiments of the disclosure to provide a chemiluminescent and thermal system that is visible to personnel employing both thermal goggles and night vision goggles. This can be achieved by employing a multiple-part system that can emit light and heat upon activation, at least a first part comprising at least one oxalate ester, at least one fluorescer, and at least one inorganic salt, and at least a second part comprising at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles.

Chemical light systems employing an oxalate ester, a peroxide, a fluorescer, and a catalyst are generally known to those skilled in the art. Also known to those skilled in the art is the temperature sensitivity of such a system. A disadvantage of typical oxalate ester chemical light systems is that they generate no detectable light at temperatures below the freezing point of water. There is therefore a need for an oxalate ester chemical light system that is less affected by low ambient temperatures.

It is accordingly an object of certain embodiments of the disclosure to provide a combined chemiluminescent and exothermic reaction that generates usable light at temperatures that occur in the normal environment. Certain embodiments of the present disclosure provide a reaction system that is self heating.

Generally, the present disclosure provides markers and signals comprising a multiple-part system, which upon activation emits light and heat, and methods of using such markers and signals. More specifically, it has been discovered that the use of certain inorganic salts in an oxalate ester/peroxide based chemiluminescent system generates heat in addition to light, sufficient to act as a visual and thermal marker.

One aspect of the disclosure is a multiple-part marking system that comprises at least one part comprising at least one oxalate ester, at least one fluorescer, and at least one inorganic salt, and at least a second part comprising at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles, wherein light and heat are emitted when the two parts interact, and wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate. In another aspect of the disclosure, light and heat are emitted instantly when the two parts intermix. In another aspect of the disclosure, the system reaches a peak emission of light and heat when the two parts of the system are completely mixed. Another aspect of the disclosure is directed to emitting light at multiple wavelengths, including multiple wavelengths in the infrared spectrum, the ultra-violet spectrum, the visible spectrum, or a combination thereof.

In another aspect of the disclosure, the multiple-part marking system comprises carrier solvents for the first part and the second part. Another aspect of the disclosure comprises additional components of the marking system. Such additional components can include thickeners to allow the marker to stick to the target better, fluorescent powders for day time target marking, and antifreeze agents to prevent freezing.

In another aspect of the disclosure, one part of the multiple-part system is contained inside a housing which keeps the at least first part of the marking system separate from the at least second part of the marking system, until such time as mixing is desired. Another aspect of the disclosure includes the multiple-part marking system being housed within hollow flexible plastic tubing, wherein the at least one part of the marking system is contained within the hollow flexible tubing, and wherein the at least second part is contained inside a sealed glass vial which is located within the flexible tubing containing the first part, wherein upon breaking of the glass vial, the two parts would intermix.

Another aspect of the disclosure is directed to a projectile comprised of a multiple-part chemiluminescent and thermal marker within the projectile, wherein the multiple-part chemiluminescent and thermal marker comprises at least one first part comprising at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate; at least one breakable barrier separating the at least one first part from at least one second part comprising at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles; wherein light and heat are emitted when the at least one breakable barrier is broken.

Yet another aspect of the disclosure is directed to a method of marking a target comprising:

a) launching a projectile containing a multiple-part chemiluminescent and thermal marking system, wherein at least one first part of the multiple-part chemiluminescent and thermal marking system comprises at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, at least one breakable barrier separating the at least one first part from at least a second part comprising at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles;

b) breaking the at least one breakable barrier between the at least one first part and the at least one second part;

c) generating light and heat as products of the reaction between the at least first part and the at least second part; and d) marking a target hit by the projectile with the activated multiple-part chemiluminescent and thermal marking system.

A further aspect of the disclosure is directed to method of signaling comprising activating a multiple-part chemiluminescent and thermal marking system by mixing at least one first part comprising at least one oxalate ester, at least one fluorescer, and at least one inorganic salt with at least one second part comprised of at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles and generating light and heat; wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate. In certain of these embodiments, the multiple-part chemiluminescent and thermal marking system is present in hollow flexible tubing, wherein the at least one first part is present within the tubing, and wherein the flexible tubing also comprises at least one sealed glass vial containing the at least one second part; and wherein the parts are mixed as a result of the tubing being flexed and the glass vial breaking and releasing the at least one second part, causing it to mix and react with the at least one first part.

Additional objects and advantages of the disclosure will be set forth in part in the description which follows, and in part will be obvious from the description, or may be learned by practice of the disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawing, which is incorporated in and constitute a part of this specification, illustrate one embodiment of the disclosure and together with the description, serve to explain the principles of the disclosure.

DESCRIPTION OF THE EMBODIMENTS

Figure 1:
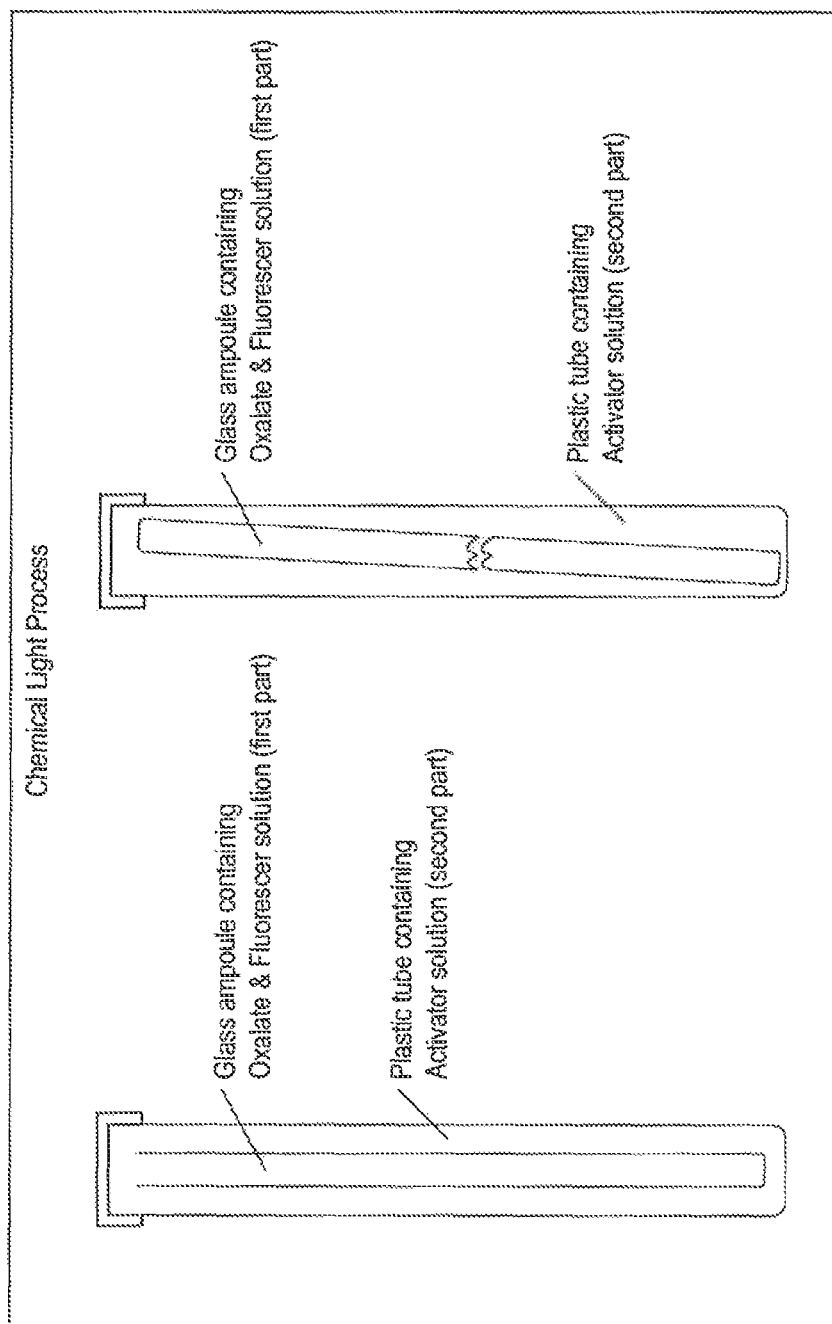
FIG. 1 represents the chemical light process showing the oxalate and fluorescer solution inside a glass ampoule and a plastic tube containing the glass ampoule and activator solution.

The multiple-part marking system of the present disclosure is identifiable, when activated, by both thermal and night vision goggles. More specifically, when the chemicals used in the multiple-part system interact, they react to emit both light and heat. "Activation" as used herein means that a chemical reaction between the multiple components has started.

The multiple-part marking system is comprised of at least two parts, maintained separately until activation. The first part is comprised of at least one oxalate ester, at least one fluorescer, and at least one inorganic salt; the second part is comprised of at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles.

The light and heat are emitted upon the components of the multiple-part system reacting. The intensity of the light and heat emitted increases as the components of the multiple-part system mix, and can reach a peak emission upon complete mixing and reaction of the at least two components together. The speed of mixing of the components is dependent upon the practical application of the marking system. At labscale, the speed of mixing is typically dependent upon how fast one part of the marking system is injected into the second part of the solution. However, when the marking system is employed within munitions or projectiles, the intense speed and rotation of the munitions or projectiles can act to completely mix the multiple-parts together almost instantaneously upon firing, and as such can allow for the peak light and heat emission to be reached almost instantaneously.

The wavelength of light emitted is dependent upon the desired application of the marker and the fluorescer chosen, and can include wavelengths in both the visual and infrared spectrum. It may be preferable to combine multiple fluorescers within one marking system to allow for the emission of light at multiple wavelengths.

The reaction rate of the multiple-part marking system can be dependent upon the amount of catalyst employed and proceeds according to first order kinetics dependent upon the temperature at which the reaction is conducted. The intensity of the light emission can also be dependent upon the amount of catalyst, the completeness of mixing, and the amount of fluorescer employed.

The multiple-part mixing system of the present disclosure has the ability to emit both light and heat. The heat may be, for example, a product of the catalytic breakdown of the hydrogen peroxide by the inorganic salt. However, not all inorganic salts will act to allow the marking system to emit both light and heat. Inorganic salts such as calcium chloride or sodium acetate act to kill the light reaction and do not provide adequate light emission. The at least one inorganic salt useful in the present disclosure are chosen from sodium thiosulphate, potassium thiosulphate, cobalt acetate, copper acetate, lead acetate, cupric chloride, ferric chloride, calcium iodide, potassium iodide, and silver nitrate. In certain embodiments, the at least one inorganic salt is present in an amount ranging from 0.1 percent to 30 percent by weight, based on the total weight of the two-part composition. For example, the at least one inorganic salt can be present in an amount ranging from 1 percent to 30 percent by weight, based on the total weight of the two-part composition, such as from 5 percent to 30 percent by weight, from 5 percent to 25 percent by weight, from 10 percent to 25 percent by weight, and from 10 percent to 20 percent by weight.

The light and heat of the marking system may, in certain embodiments, last for approximately 2 minutes, for up to 20 minutes, or for up to 30 minutes. In other embodiments, the marking system of the present disclosure continues emitting light and heat for at least 30 minutes. These embodiments can enable multiple troop carriers to be able to pass by the same marked target. In such embodiments, a target marked by a first troop carrier will still be visible to a troop carrier farther back on a route, wherein the later troop carrier may be more well-suited to handle the object of the marking. The length of time a marking system maintains its light emission can be a product of the reaction, or can be the result of the catalyst employed. The length of time a marking system maintains its temperature can be dependent upon the thermal mass of the marking system, and therefore a marking system solution maintained within tubing or a contained housing will maintain its heat longer than a marking system solution that is released from its housing and spread out on a target.

The first part of the marking system comprises at least one fluorescer as described above, as well as at least one oxalate ester, and at least one inorganic salt as described above. The first part of the marking system may optionally comprise at least one carrier.

Examples of the at least one oxalate useful in the present disclosure include bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2,4,5-trichloro-6-carboisopentoxyphenyl)oxalate; bis(2,4,5-trichloro-6-carbobenzoxyphenyl) oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl)oxalate; bis(1,2-dimethyl-4,6-dinitrophenyl)oxalate; bis(2,4-dichlorophenyl)oxalate; bis(2,4-dinitrophenyl)oxalate; bis(2,5-dinitrophenyl)oxalate; bis(2-formyl-4-nitrophenyl)oxalate; bis(pentachlorophenyl)oxalate; bis(1,2-dihydro-2-oxo-1-pyridyl)glyoxal; bis(2,4-dinitro-6-methylphenyl)oxalate; bis-N-phthalimidyl oxalate, oxalates represented by the general formula (I)

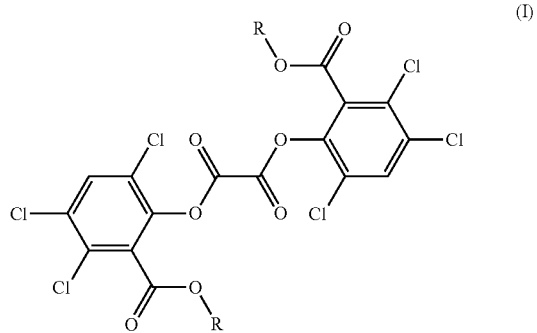

wherein R=CH$_2$A and A is chosen from alkyl chains, alkyl rings, and aromatic rings or combinations thereof, such that R is linear or nonlinear, and further such that R comprises from 4-15 carbons, as well as mixtures of any of the foregoing oxalates.

Examples of oxalates represented by formula (I) include: bis{3,4,6-trichloro-2-[(2-methylpropoxy)carbonyl]phenyl}oxalate; bis{3,4,6-trichloro-2-[(cyclopropylmethoxy)carbonyl]phenyl}oxalate; bis{3,4,6-trichloro-2-[(2-methylbutoxy)carbonyl]phenyl}oxalate; bis{3,4,6-trichloro-2-[(3-methylbutoxy)carbonyl]phenyl}oxalate; bis{3,4,6-trichloro-2-[(2,2-dimethylpropoxy)carbonyl]phenyl}oxalate; bis{3,4,6-trichloro-2-[(2-methylpentyloxy)carbonyl]phenyl}oxalate; bis{3,4,6-trichloro-2-[(3-methylpentyloxy)carbonyl]phenyl}oxalate; bis{3,4,6-tri chloro-2-[(4-methylpentyloxy)carbonyl]phenyl}oxalate; bis{3,4,6-trichloro-2-[(3,3-dimethylbutoxy)carbonyl]phenyl}oxalate; bis{3,4,6-trichloro-2-[(2-ethylbutoxy)carbonyl]phenyl}oxalate; bis{3,4,6-trichloro-2-[(cyclopentylmethoxy)carbonyl]phenyl}oxalate; bis{3,4,6-trichloro-2-[(2-methylhexyloxy)carbonyl]phenyl}oxalate; bis{3,4,6-trichloro-2-[(3-methylhexyloxy)carbonyl]phenyl}oxalate; bis{3,4,6-trichloro-2-[(4-methylhexyloxy)carbonyl]phenyl}oxalate; bis{3,4,6-trichloro-2-[(5-methylhexyloxy)carbonyl]phenyl}oxalate; bis{3,4,6-trichloro-2-[(cyclohexylmethoxy)carbonyl]phenyl}oxalate; bis{3,4,6-trichloro-2-[(phenylmethoxy)carbonyl]phenyl}oxalate; bis{3,4,6-trichloro-2-[(2-phenylethoxy)carbonyl]phenyl}oxalate; bis(3,4,6-trichloro-2-{[(2-methylphenyl)methoxy]carbonyl}phenyl)oxalate; bis(3,4,6-trichloro-2-{[(3-methylphenyl)methoxy]carbonyl}phenyl)oxalate; bis(3,4,6-trichloro-2-{[(4-methylphenyl)methoxy]carbonyl}phenyl)oxalate; bis(3,4,6-trichloro-2-{[(2,3-dimethylphenyl)methoxy]carbonyl}phenyl)oxalate; bis(3,4,6-trichloro-2-{[(2,4-dimethylphenyl)methoxy]carbonyl}phenyl)oxalate; bis(3,4,6-trichloro-2-{[3,4-dimethylphenyl)methoxy]carbonyl}phenyl)oxalate; bis(3,4,6-trichloro-2-{[(3,5-dimethylphenyl)methoxy]carbonyl}phenyl)oxalate; bis(3,4,6-trichloro-2-{[(2,6-dimethylphenyl)methoxy]carbonyl}phenyl)oxalate; bis(3,4,6-trichloro-2-{[(2-ethylphenyl)methoxy]carbonyl}phenyl)oxalate; bis(3,4,6-trichloro-2-{[(3-ethylphenyl)methoxy]carbonyl}phenyl)oxalate; bis(3,4,6-trichloro-2-{[(4-ethylphenyl)methoxy]carbonyl}phenyl)oxalate; bis(3,4,6-trichloro-2-{[2-(2-methylphenyl)ethoxy]carbonyl}phenyl)oxalate; bis(3,4,6-trichloro-2-{[2-(3-methylphenyl)ethoxy]carbonyl}phenyl)oxalate; bis(3,4,6-trichloro-2-{[2-(4-methylphenyl)ethoxy]carbonyl}phenyl)oxalate; bis{3,4,6-trichloro-2-[(2-phenylpropoxy)carbonyl]phenyl}oxalate; bis{3,4,6-trichloro-2-[(3-phenylpropoxy)carbonyl]phenyl}oxalate; bis{3,4,6-trichloro-2-[1-naphthalenylmethoxy)carbonyl]phenyl}oxalate; bis{3,4,6-trichloro-2-[2-naphthalenylmethoxy)carbonyl]phenyl}oxalate; bis{3,4,6-trichloro-2-[(2,2-diphenylethoxy)carbonyl]phenyl}oxalate; bis{3,4,6-trichloro-2-[(9-fluorenylmethoxy)carbonyl]phenyl}oxalate; and bis{3,4,6-trichloro-2-[(9-anthracenylmethoxy)carbonyl]phenyl}oxalate.

Additional examples of oxalates represented by general formula (I) are disclosed in U.S. Published Application No. 2011-0084243, the disclosure of such oxalates being incorporated herein by reference.

Examples of the at least one fluorescer useful in the present disclosure include 1-methoxy-9,10-bis(phenylethynyl)anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4methoxyphenyl)anthracene; 9,10-bis(phenylethynyl)anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene; 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N, N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-di-neopentyl-3,4,9,10-perylene dicarboximide; 1,6,7,12-tetra(p-t-butylphenoxy)-N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'-bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; 1,4-dimethyl-9,10-bis(phenylethynyl)anthracene, and mixtures thereof.

The amount of the at least one oxalate and the at least one fluorescer employed is upwardly limited only by the solubility of the ester and fluorescer in the solvent chosen. However, as would be appreciated by one in the art, the efficiency of the reaction would decrease at certain high concentrations. In certain embodiments, the at least one oxalate is present in an amount ranging from 3 percent to 60 percent by weight, based on the total weight of the two-part composition. For example, the at least one oxalate can be present in an amount ranging from 3 percent to 50 percent by weight, based on the total weight of the two-part composition, such as from 3 percent to 40 percent by weight, from 3 percent to 30 percent by weight, from 5 percent to 25 percent by weight, and from 7 percent to 25 percent by weight. In certain embodiments, the at least one fluorescer is present in an amount ranging from 0.05 percent to 0.9 percent by weight based on the total weight of the two-part composition. For example, the at least one fluorescer can be present in an amount ranging from greater than 0.05 percent by weight to 0.9 percent by weight, based on the total weight of the two-part composition, such as from greater than 0.1 percent by weight, from greater than 0.2 percent by weight, from greater than 0.3 percent by weight, from greater than 0.4 percent by weight, from greater than 0.5 percent by weight, from greater than 0.6 percent by weight, from greater than 0.7 percent by weight, and from greater than 0.8 percent by weight. In addition, the at least one fluorescer can be present in an amount ranging from 0.05 percent by weight to less than 0.9 percent by weight, based on the total weight of the two-part composition, such as from less than 0.8 percent by weight, from less than 0.7 percent by weight, from less than 0.6 percent by weight, from less than 0.5 percent by weight, from less than 0.4 percent by weight, from less than 0.3 percent by weight, from less than 0.2 percent by weight, and from less than 0.1 percent by weight. It is also intended that the amount of the at least one oxalate and the at least one fluorescer can range between any of the numerical values listed above.

The marking system can comprise at least one carrier, e.g., first solvent. Examples of the at least one carrier for the at least first part of the multiple-part marking system useful in the present disclosure include dimethyl phthalate, dibutyl phthalate, dioctal phthalate, butyl benzoate, acetyl triethyl citrate, triethyl citrate, ethylene glycol dibenzoate, and propylene glycol dialkyl ether containing one to three propylene moieties and each alkyl group is independently a straight-chain or branched-chain alkyl group containing up to 8 carbon atoms. Further examples of the at least one carrier for the at least first part of the multiple-part marking system include propylene glycol dialkyl ethers containing two propylene moieties such as dipropylene glycol dimethyl ether, dipropylene glycol diethyl ether and dipropylene glycol di-t-butyl ether, dibutyl phthalate, butyl benzoate, propylene glycol dibenzoate, ethyl-hexyl diphenyl phosphate, and mixtures thereof. In certain embodiments, the at least one carrier is present in an amount ranging from 5 percent to 95 percent by weight, based on the total weight of the two-part composition. For example, the at least one carrier can be present in an amount ranging from greater than 5 percent by weight to 95 percent by weight, based on the total weight of the two-part composition, such as from greater than 10 percent by weight, from greater than 20 percent by weight, from greater than 30 percent by weight, from greater than 40 percent by weight, from greater than 50 percent by weight, from greater than 60 percent by weight, from greater than 70 percent by weight, from greater than 80 percent by weight, and from greater than 90 percent by weight. In addition, the at least one carrier can be present in an amount ranging from 5 percent by weight to less than 95 percent by weight, based on the total weight of the two-part composition, such as from less than 90 percent by weight, from less than 80 percent by weight, from less than 70 percent by weight, from less than 60 percent by weight, from less than 50 percent by weight, from less than 40 percent by weight, from less than 30 percent by weight, from less than 20 percent by weight, and from less than 10 percent by weight. It is also intended that the amount of at least one carrier can range between any of the numerical values listed above.

The second part of the marking system comprises at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles. The second part of the marking system may optionally comprise at least one carrier.

The at least one catalyst useful in the present disclosure is chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazole's, and substituted imidazoles. As used herein, the term "substituted" refers to a group in which one or more hydrogen atoms are independently replaced with the same or different substituent(s). Typical substituents include, for example, X and R, wherein where each X is independently chosen from a halogen atom; and each R is independently chosen from hydrogen, an alkyl group, and a substituted alkyl group. As used herein, an "alkyl group" refers to a saturated or unsaturated, branched, straight-chain or cyclic monovalent hydrocarbon group derived by the removal of one hydrogen atom from a single carbon atom of a parent alkane. Typical alkyl groups include, for example, methyl, ethyl, propyl, butyl, and the like. In certain embodiments, the alkyl group comprises from 1 to 20 carbon atoms.

In certain embodiments, the at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles is present in an amount ranging from 0.0005 percent to 0.5 percent by weight, based on the total weight of the two-part composition. For example, the at least one catalyst can be present in an amount ranging from greater than 0.0005 percent by weight to 10 percent by weight, based on the total weight of the chemiluminescent marking composition, such as from 0.001 percent or greater by weight, from 0.005 percent or greater by weight, from 0.01 percent or greater by weight, from 0.05 percent or greater by weight, from 0.1 percent or greater by weight, from 0.25 percent or greater by weight, from 0.5 percent or greater by weight, from 1 percent or greater by weight, from 1.5 percent or greater by weight, from 2 percent or greater by weight, from 2.5 percent or greater by weight, from 3 percent or greater by weight, from 3.5 percent or greater by weight, from 4 percent or greater by weight, from 4.5 percent or greater by weight, from 5 percent or greater by weight, and from 7.5 percent or greater by weight. In addition, the at least one catalyst can be present in an amount ranging from 0.0005 percent by weight to less than 10 percent by weight, based on the total weight of the viscous chemiluminescent composition, such as from 7.5 percent or less by weight, from 5 percent or less by weight, from 4.5 percent or less by weight, from 4 percent or less by weight, from 3.5 percent or less by weight, from 3 percent or less by weight, from 2.5 percent or less by weight, from 2 percent or less by weight, from 1.5 percent or less by weight, from 1 percent or less by weight, from 0.5 percent or less by weight, from 0.25 percent or less by weight, from 0.1 percent or less by weight, from 0.05 percent or less by weight, from 0.01 percent or less by weight, from 0.005 percent or less by weight, and from 0.001 percent or less by weight. It is also intended that the amount of at least one catalyst can range between any of the numerical values listed above.

Examples of the at least one peroxide useful in the present disclosure include hydrogen peroxide; sodium peroxide; sodium perborate; sodium pyrophosphate peroxide; urea peroxide; histidine peroxide; t-butyl-hydroperoxide; and peroxybenzoic acid, sodium percarbonate, and mixtures thereof. In certain embodiments, the at least one peroxide is present in an amount ranging from 0.25 percent to 25 percent by weight, based on the total weight of the two-part composition. For example, the at least one peroxide can be present in an amount ranging from 0.25 percent to 20 percent by weight, based on the total weight of the two-part composition, such as from 0.5 percent to 20 percent by weight, from 0.5 percent to 15 percent by weight, from 0.5 percent to 10 percent by weight, and from 0.5 percent to 6 percent by weight. In certain embodiments, the at least one peroxide of the present disclosure can be hydrogen peroxide.

Examples of the at least one carrier for the at least one second part of the multiple-part marking system useful in the present disclosure include dimethyl phthalate, triethyl citrate, ethylene glycol dibenzoate, and mixtures thereof.

Additional components that may be present in either component of the multiple-part marking system include, but are not limited to, thickeners to allow the marker to stick to the target better, fluorescent powders for day time target marking, and antifreeze agents to prevent freezing, film formers, gelling agents, polyacrylamides, and polyvinylchloride. These additional components are those well known in the art to be suitable for the above purposes.

The marking system of the present disclosure can be contained in any suitable housing or container. In certain embodiments, the container separates the at least two parts of the marking system from interacting prior to the time marking is desired. In additional embodiments, the container can be comprised of hollow flexible tubing containing therein a) at least a first solution comprised of at least one oxalate ester, at least one fluorescer, and at least one inorganic salt, and b) at least one sealed glass vial containing therein at least a second solution of at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles, wherein the at least one sealed glass vial can be comprised within the first solution inside the hollow flexible tubing, and wherein when the glass vial breaks the two parts can mix and react together. The flexible tubing can be sealed at both ends and can be comprised of an opaque or transparent plastic. The light and heat can be generated when the flexible tubing is flexed, causing the glass vial inside to break, allowing mixing of the at least two solutions. Placing the marking system within flexible plastic tubing can act to prevent premature breaking of the glass vial and prevent premature mixing of the chemicals. FIG. 1, represents a schematic of one type of flexible plastic tubing/glass vial structure that may contain the multiple-part marking system of the present disclosure.

A method of signaling is disclosed herein, wherein the multiple-part marking system can be activated by physically making the at least one part of the marking system comprised of at least one fluorescer, at least one oxalate ester, and at least one inorganic salt, mix and react with the at least second part of the marking system comprised of at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles, wherein light and heat can be generated. In certain embodiments, the method includes the multiple-part marking system being present in hollow flexible tubing containing therein a) at least a first solution comprised of at least one oxalate ester, at least one fluorescer, and at least one inorganic salt; and b) at least one sealed glass vial containing therein at least a second solution of at lest one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles, wherein the sealed glass vial is comprised within the first solution inside the hollow flexible tubing, and comprises flexing the tubing and breaking the glass vial contained therein; allowing the mixing of the two solutions.

The marking system of the present disclosure can also be used in projectiles of all types, wherein it is desired to mark the target of the projectile. In certain embodiments, the marking system can be included within the projectile in the above described flexible tubing and glass vial configuration. Projectiles may be of the type such as 18 mm rocket propelled grade munitions, howitzer shells, gravity bombs, and may also include smaller caliber munitions, such as for use in pistols or guns, medium caliber munitions, such as those ranging from 20 mm to 83 mm, and larger caliber munitions, such as those ranging from 83 mm to 155 mm.

A method of marking is also disclosed herein, comprising the steps of launching a projectile containing a multiple-part chemiluminescent and thermal marking system, wherein at least a first part comprising at least one oxalate ester, at least one fluorescer, and at least one inorganic salt is separated by at least one breakable barrier from at least a second part comprising at least one peroxide and at least one catalyst chosen from sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles; breaking the at least one barrier between the at least first part and the at least second part; generating light and heat as products of the reaction between the at least first part and the at least second part, and marking a target hit by the projectile with the activated multiple-part chemiluminescent and thermal marking system.

The marking system of the present disclosure may also act as a tracer, wherein the light and heat generated as a result of the reaction is visible during the flight of the projectile.

The hollow plastic tubing may be of any size or shape suitable for holding a glass vial and the multiple-part marking system as described herein, and as needed for the application intended.

EXAMPLES

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

As used herein, the light emitted by the marking system is measured using a light meter with a probe chosen dependent upon the light being emitted (infrared, visual, etc). For example, for light emission in the visible spectrum an irradiance probe is used. One of ordinary skill in the art would be well aware of how to select a probe suitable for measuring the wavelength of light the marking system has been designed to emit. The light emission is presented in LUX units. An optical pyrometer is aimed at the mixed solutions of the present examples to measure the temperature output of the marking system.

Example 1

A two part marking system according to the present disclosure was prepared, activated, and the results measured. An oxalate solution was prepared by mixing 23.5% by weight bis (2,4,5-trichloro-6-carboientoxypheny)oxalate and 0.2% by weight Rubrene into 77.3% by weight butyl benzoate. To this was added 5% by weight sodium thiosulfate. An activator solution was prepared by mixing 3.5% by weight of 70% hydrogen peroxide with 10% by weight t-butanol and 82.5% by weight triethyl citrate. The two separate mixtures were divided equally. The activator solution was catalyzed with 6.1% by weight 1,2,4-triazole (915mM). The activator solution was mixed with the oxalate solution at a one to one ratio and light output was measured versus time.

The mixture reached light output maximums of approximately 400 lumens per square meter after 10 seconds. The triazole-catalyzed mixture was essentially out (less than 0.1 lumen per square meter light output) after one minute. Additionally, an optical pyrometer was aimed at the liquid surface during activator addition and the apparent temperature was measured. The liquid surface apparent temperature changed from 24° C. prior to activator addition to 95° C. within seconds of activator addition.

Example 2

A two part marking system according to the present disclosure was prepared, activated, and the results measured. An oxalate solution was prepared by mixing 23.5% by weight bis (2,4,5-trichloro-6-carbopentoxyphenyl)oxalate and 0.2% by weight Rubrene into 77.3% by weight butyl benzoate. To this was added 7% by weight potassium thiosulfate. An activator solution was prepared by mixing 3.5% by weight of 70% hydrogen peroxide with 10% by weight t-butanol and 82.5% by weight triethyl citrate. The activator solution was catalyzed with 10.6% by weight benzotriazole (1 M). The activator solution was mixed with the oxalate solution at a one to one ratio and light output was measured versus time.

The mixture reached light output maximum of approximately 600 lumens per square meter after 5 seconds. The benzotriazole-catalyzed mixture was essentially out (less than 0.1 lumen per square meter light output) before one minute. Additionally, an optical pyrometer was aimed at the liquid surface during activator addition and the apparent temperature was measured. The liquid surface apparent temperature changed from 24° C. prior to activator addition to 95° C. within seconds of activator addition.

Example 3

A two part marking system according to the present disclosure was prepared, activated, and the results measured. An oxalate solution was prepared by mixing 23.5% by weight bis(2,4,5-trichloro-6-carbopentoxphenyl)oxalate and 0.2% by weight Rubrene into 77.3% by weight butyl benzoate. To this was added 3% by weight silver nitrate. An activator solution was prepared by mixing 3.5% by weight of 70% hydrogen peroxide with 10% by weight t-butanol and 82.5% by weight triethyl citrate. The activator solution was catalyzed with 1.38% by weight imidazole (14 mM). The activator solution was mixed with the oxalate solution at a one to one ratio and light output is measured versus time.

The mixture reached light output maximums of approximately 600 lumens per square meter after 5 seconds. The imidazole-catalyzed mixture is essentially out (less than 0.1 lumen per square meter light output) before one minute. Additionally, an optical pyrometer was aimed at the liquid surface during activator addition and the apparent temperature was measured. The liquid surface apparent temperature changed from 24° C. prior to activator addition to 85° C. within seconds of activator addition.

Example 4

An oxalate solution was prepared by mixing 23.5% by weight bis(2,4,5-trichloro-6-carbopentoxyphenyl) and 0.2% by weight Rubrene into 77.3% by weight butyl benzoate. To this was added 5% by weight sodium thiosulfate. An activator solution was prepared by mixing 3.5% by weight of 70% hydrogen peroxide with 10% by weight t-butanol and 82.5% by weight triethyl citrate. The two separate mixtures were divided into equal parts. One of the activator solutions was catalyzed with 319mMol 1,2,4-triazole. A second activator solution was catalyzed with 629mMol 1,2,4-triazole. A third activator solution was catalyzed with 941mMol 1,2,4-triazole.

Sample 6" light sticks were made of each separate activator and oxalate solution at a ratio of 2.8 grams of the oxalate solution sealed into a glass ampoule, and the ampoule being placed inside the 6" light stick plastic tube containing 7.8 grams of the respective activator solution. The different light sticks were divided into three groups. One group was temperature equilibrated at 35° F. The second group was temperature equilibrated at 75° F. The third and final group was temperature equilibrated at 95° F.

Figure 2:
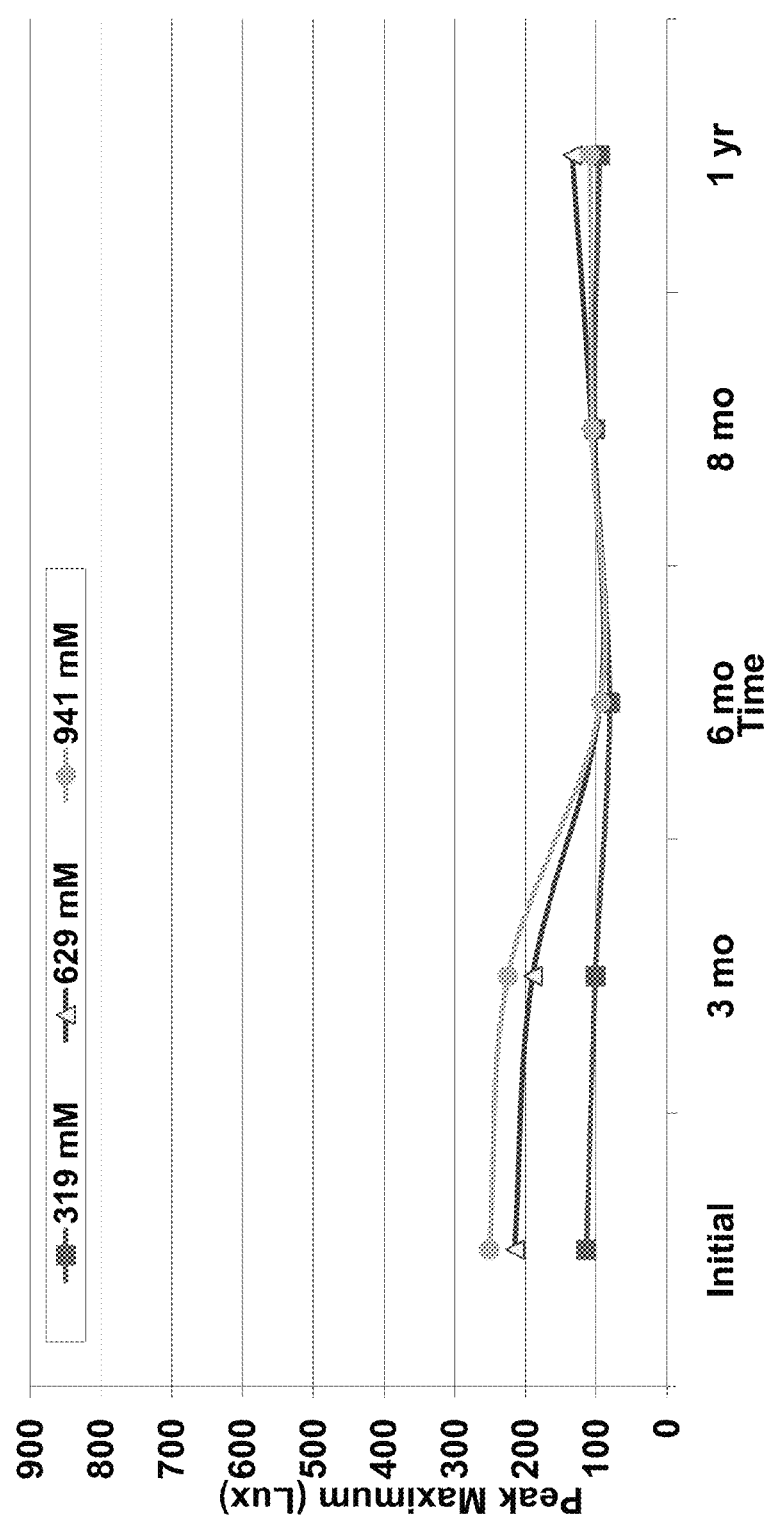
FIG. 2 depicts test results directed to the shelf stability at 35° F. of activators according to the present disclosure.
Figure 3:
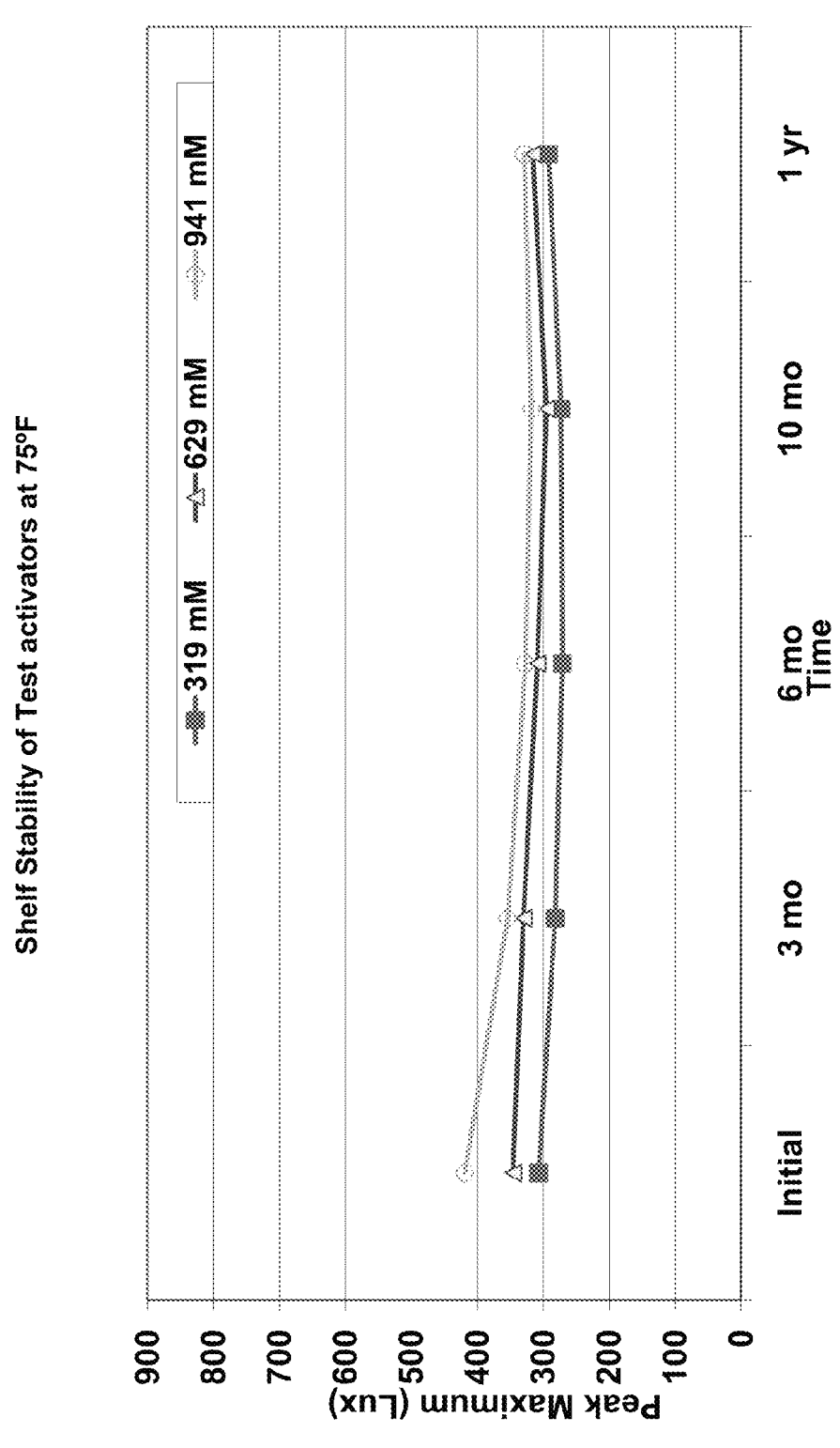
FIG. 3 depicts test results directed to the shelf stability at 75° F. of activators according to the present disclosure.
Figure 4:
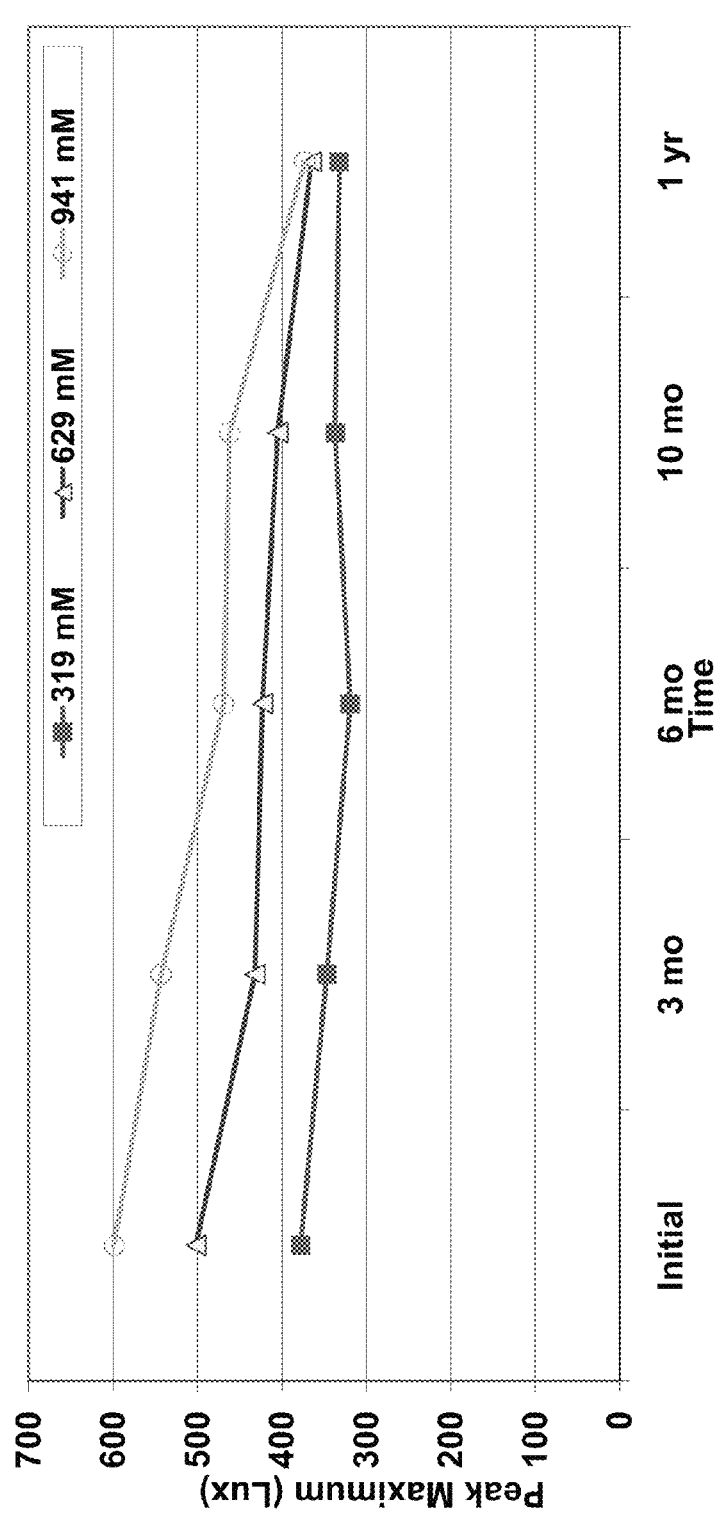
FIG. 4 depicts test results directed to the shelf stability at 95° F. of activators according to the present disclosure.

The light sticks were then activated and light output was measured versus time at a rate of five readings per second. The peak (maximum) measured value and the sum of the first ten seconds of values was graphed at each temperature. The solutions were then aged and retested at three months, six months, ten months, one year, and one and one half years. The results are set forth in FIG. 2 (shelf stability at 35° F.), FIG. 3 (shelf stability at 75° F.), and FIG. 4 (shelf stability at 95° F.). Additionally, the surface temperature of the light sticks was measured with an optical pyrometer. All of the light sticks exhibited a temperature rise of over 30° C. starting within 1 minute of activation.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A multiple-part marking system that comprises at least one first part comprising at least one oxalate ester, at least one fluorescer, and at least one inorganic salt; and at least one second part comprising at least one peroxide and at least one catalyst chosen from sodium salicylate, lithium salicylate, 5-chlorolithium salicylate, triazoles, substituted triazoles, imidazoles, and substituted imidazoles; wherein light and heat are emitted when the two parts interact; wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, and wherein the at least one inorganic salt is present in an amount ranging from 0.1 percent to 30 percent by weight based on the total weight of the two-part composition.

2. The multiple-part marking system according to claim 1, wherein the at least one oxalate ester is chosen from bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2,4,5-trichloro-6-carboisopentoxyphenyl)oxalate; bis(2,4,5-trichloro-6-carbobenzoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl)oxalate; bis(1,2-dimethyl-4,6-dinitrophenyl)oxalate; bis(2,4-dichlorophenyl)oxalate; bis(2,4-dinitrophenyl)oxalate; bis(2,5dinitrophenyl)oxalate; bis(2-formyl-4-nitrophenyl)oxalate; bis(pentachlorophenyl)oxalate; bis(1,2-dihydro-2-oxo-1-pyridyl)glyoxal; bis(2,4-dinitro-6-methylphenyl)oxalate; bis-N-phthalimidyl oxalate.

3. The multiple-part marking system according to claim 1, wherein the at least one oxalate ester is chosen from oxalates represented by the general formula (I)

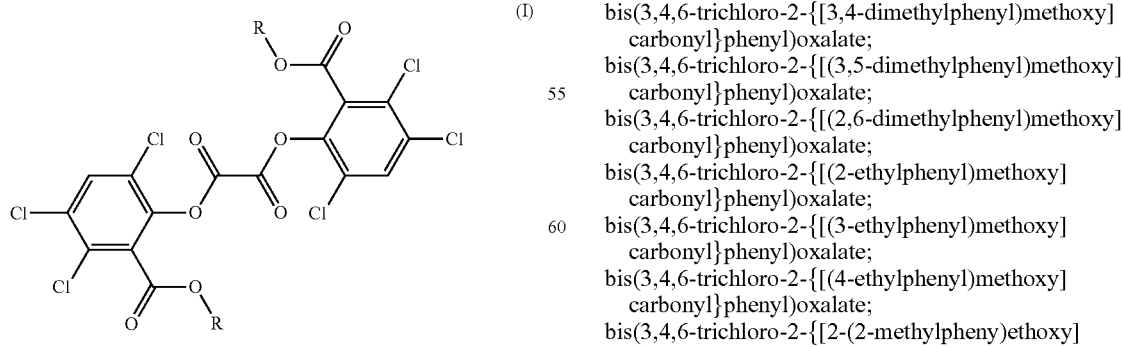

wherein R =CH$_2$A and A is chosen from alkyl chains, alkyl rings, and aromatic rings or combinations thereof, and wherein R is linear or nonlinear, and comprises from 4-15 carbon atoms.

4. The multiple-part marking system according to claim 1, wherein the at least one oxalate ester is chosen from:
bis{3,4,6-trichloro-2-[(2-methylpropoxy)carbonyl]phenyl}oxalate;
bis{3,4,6-trichloro-2-[(cyclopropylmethoxy)carbonyl]phenyl}oxalate;
bis{3,4,6-trichloro-2-[(2-methylbutoxy)carbonyl]phenyl}oxalate;
bis{3,4,6-trichloro-2-[(3-methylbutoxy)carbonyl]phenyl}oxalate;
bis{3,4,6-trichloro-2-[(2,2-dimethylpropoxy)carbonyl]phenyl}oxalate;
bis{3,4,6-trichloro-2-[(2-methylpentyloxy)carbonyl]phenyl}oxalate;
bis{3,4,6-trichloro-2-[(3-methylpentyloxy)carbonyl]phenyl}oxalate;
bis{3,4,6-tri chloro-2-[(4-methylpentyloxy)carbonyl]phenyl}oxalate;
bis{3,4,6-trichloro-2-[(3,3-dimethylbutoxy)carbonyl]phenyl}oxalate;
bis{3,4,6-trichloro-2-[(2-ethylbutoxy)carbonyl]phenyl}oxalate;
bis{3,4,6-trichloro-2-[(cyclopentylmethoxy)carbonyl]phenyl}oxalate;
bis{3,4,6-trichloro-2-[(2-methylhexyloxy)carbonyl]phenyl}oxalate;
bis{3,4,6-trichloro-2-[(3-methylhexyloxy)carbonyl]phenyl}oxalate;
bis{3,4,6-trichloro-2-[(4-methylhexyloxy)carbonyl]phenyl}oxalate;
bis{3,4,6-trichloro-2-[(5-methylhexyloxy)carbonyl]phenyl}oxalate;
bis{3,4,6-trichloro-2-[(cyclohexylmethoxy)carbonyl]phenyl}oxalate;
bis{3,4,6-trichloro-2-[(phenylmethoxy)carbonyl]phenyl}oxalate;
bis{3,4,6-trichloro-2-[(2-phenylethoxy)carbonyl]phenyl}oxalate;
bis(3,4,6-trichloro-2-{[(2-methylphenyl)methoxy]carbonyl}phenyl)oxalate;
bis(3,4,6-trichloro-2-{[(3-methylphenyl)methoxy]carbonyl}phenyl)oxalate;
bis(3,4,6-trichloro-2-{[(4-methylphenyl)methoxy]carbonyl}phenyl)oxalate;
bis(3,4,6-trichloro-2-{[(2,3-dimethylphenyl)methoxy]carbonyl}phenyl)oxalate;
bis(3,4,6-trichloro-2-{[(2,4-dimethylphenyl)methoxy]carbonyl}phenyl)oxalate;
bis(3,4,6-trichloro-2-{[3,4-dimethylphenyl)methoxy]carbonyl}phenyl)oxalate;
bis(3,4,6-trichloro-2-{[(3,5-dimethylphenyl)methoxy]carbonyl}phenyl)oxalate;
bis(3,4,6-trichloro-2-{[(2,6-dimethylphenyl)methoxy]carbonyl}phenyl)oxalate;
bis(3,4,6-trichloro-2-{[(2-ethylphenyl)methoxy]carbonyl}phenyl)oxalate;
bis(3,4,6-trichloro-2-{[(3-ethylphenyl)methoxy]carbonyl}phenyl)oxalate;
bis(3,4,6-trichloro-2-{[(4-ethylphenyl)methoxy]carbonyl}phenyl)oxalate;
bis(3,4,6-trichloro-2-{[2-(2-methylpheny)ethoxy]carbonyl}phenyl)oxalate;
bis(3,4,6-trichloro-2-{[2-(3-methylphenyl)ethoxy]carbonyl}phenyl)oxalate;

bis(3,4,6-trichloro-2-{[2-(4-methylphenyl)ethoxy] carbonyl}phenyl)oxalate;
bis{3,4,6-trichloro-2-[(2-phenylpropoxy)carbonyl] phenyl}oxalate;
bis{3,4,6-trichloro-2-[(3-phenylpropoxy)carbonyl] phenyl}oxalate;
bis{3,4,6-trichloro-2[1-naphthalenylmethoxy)carbonyl] phenyl}oxalate;
bis{3,4,6-trichloro-2-[2-naphthalenylmethoxy)carbonyl] phenyl}oxalate;
bis{3,4,6-trichloro-2-[(2,2-diphenylethoxy)carbonyl] phenyl}oxalate;
bis{3,4,6-trichloro-2-[(9-fluorenylmethoxy)carbonyl] phenyl}oxalate; and
bis{3,4,6-trichloro-2-[(9-anthracenylmethoxy)carbonyl] phenyl}oxalate.

5. The multiple-part marking system according to claim 1, wherein the at least one oxalate ester is present in an amount ranging from 3 percent to 60 percent by weight, based on the total weight of the two-part composition.

6. The multiple-part marking system according to claim 1, wherein the at least one fluorescer is chosen from 1-methoxy-9,10-bis(phenylethynyl) anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4methoxyphenyl)anthracene; 9,10-bis(phenylethynyl)anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene, 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-pe rylene dicarboximide; 1,6,7,12-tetraphenoxy-N,N'-di-neopentyl-3,4,9,10-perylene dicarboximide; 1,6,7,12-tetra(p-t-butylphenoxy)-N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'-bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; 1,4-dimethyl-9,10-bis(phenylethynyl)anthracene.

7. The multiple-part marking system according to claim 1, wherein the at least one fluorescer is present in an amount ranging from 0.05 percent to 0.9 percent by weight, based on the total weight of the two-part composition.

8. The multiple-part marking system according to claim 1, wherein the at least one peroxide is chosen from hydrogen peroxide; sodium peroxide; sodium perborate; sodium pyrophosphate peroxide; urea peroxide; histidine peroxide; t-butyl-hydroperoxide; peroxybenzoic acid, and sodium percarbonate.

9. The multiple-part marking system according to claim 1, wherein the at least one peroxide is present in an amount ranging from 0.25 percent to 25 percent by weight, based on the total weight of the two-part composition.

10. The multiple-part marking system according to claim 1, wherein the at least one catalyst is present in an amount ranging from 0.0005 percent to 0.5 percent by weight, based on the total weight of the two-part composition.

11. The multiple-part marking system according to claim 1 further comprising at least one carrier present in an amount ranging from 5 percent to 95 percent by weight, based on the total weight of the two-part composition.

12. A chemiluminescent and thermal marker comprising hollow flexible tubing comprising:
a) at least one first part comprising at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate and wherein the at least one inorganic salt is present in an amount ranging from 0.1 percent to 30 percent by weight based on the total weight of the two-part composition;
b) at least one sealed glass vial comprising therein at least one second part comprising at least one peroxide and at least one catalyst chosen from sodium salicylate, lithium salicylate, 5-chlorolithium salicylate, triazoles, substituted triazoles, imidazoles, and substituted imidazoles;
wherein the at least one sealed glass vial is comprised within the at least one first part, and wherein breaking the at least one sealed glass vial will cause the at least one first part and the at least one second part to mix and react together.

13. A projectile comprised of a multiple-part chemiluminescent and thermal marker within the projectile, wherein the multiple-part chemiluminescent and thermal marker comprises
at least one first part comprising at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, and wherein the at least one inorganic salt is present in an amount ranging from 0.1 percent to 30 percent by weight based on the total weight of the tow-part composition;
at least one breakable barrier separating the at least one first part from at least one second part comprising at least one peroxide and at least one catalyst chosen from sodium salicylate, lithium salicylate, 5-chlorolithium salicylate, triazoles, substituted triazoles, imidazoles, and substituted imidazoles;
wherein light and heat are emitted when the at least one breakable barrier is broken.

14. A projectile according to claim 13, wherein the multiple-part chemiluminescent and thermal marker comprised within the projectile is housed in hollow flexible tubing, wherein the at least one first part is present within the tubing, and wherein the flexible tubing also comprises at least one sealed glass vial containing the at least one second part; and wherein the parts are mixed as a result of the tubing being flexed and the glass vial breaking and releasing the at least one second part.

15. A method of marking a target comprising:
a) launching a projectile containing a multiple-part chemiluminescent and thermal marking system according to claim 13;
b) breaking the at least one breakable barrier between the at least one first part and the at least one second part;

c) generating light and heat as products of the reaction between the at least first part and the at least second part; and
d) marking a target hit by the projectile with the activated multiple-part chemiluminescent and thermal marking system.

* * * * *